Jan. 23, 1923. Re. 15,532

H. L. FELLOWES.
FOLDABLE BOX AND BLANK THEREFOR.
ORIGINAL FILED FEB. 22, 1921.

Inventor
Harry L. Fellowes
Williams Bradbury
McCaleb & Pierce Attys

Reissued Jan. 23, 1923.

Re. 15,532

UNITED STATES PATENT OFFICE.

HARRY L. FELLOWES, OF CHICAGO, ILLINOIS, ASSIGNOR TO BANKERS BOX COMPANY, OF CHICAGO, ILLINOIS, A CORPORATION OF ILLINOIS.

FOLDABLE BOX AND BLANK THEREFOR.

Original No. 1,369,642, dated February 22, 1921, Serial No. 239,094, filed June 10, 1918. Application for reissue filed November 6, 1922. Serial No. 599,373.

*To all whom it may concern:*

Be it known that I, HARRY L. FELLOWES, a citizen of the United States of America, and a resident of Chicago, county of Cook, and State of Illinois, have invented certain new and useful Improvements in Foldable Boxes and Blanks Therefor, of which the following is a specification.

My invention relates to foldable boxes and has for its object improvements in such devices.

One of the salient features of the invention is the fact that a gummed strip of textile fabric adheres to and extends transversely of the lower surface of each end bottom-flap at its inner margin, each of these strips being substantially longer than the box is wide and projecting beyond the lateral margins of the flap to which it adheres. In preparing the box for use, its end bottom-flaps are caused to lie under the ends of its lateral bottom-flaps, and the extremities of the fabric strips are turned up against and caused to adhere to the sides of the box. When the box is ready for use, the fabric strips constitute tension members which suspend the weight of the contents of the box from its side walls. The fabric strips not only materially increase the weight carrying capacity of the box, but enable it to be made ready for use very easily and expeditiously.

Another feature of the invention is the provision of novel means for holding its top-flaps in closed position.

Figure 1:
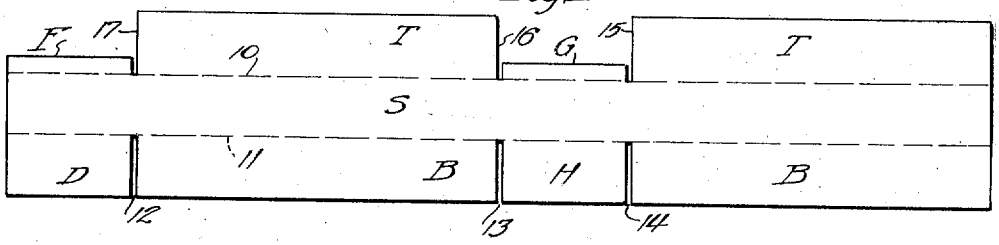
Figure 1 is the blank from which the box is formed.

Referring to Figure 1, the part S of the blank between the dotted lines 10 and 11 forms the sides S′ and ends E of the finished box. The parts T of the blank form the top of the finished box, and the parts B form the bottom thereof. The dotted lines 10 and 11 represent lines along which the blank is folded.

In the blank are cut slots 12, 13, 14, 15, 16 and 17. These slots extend from the outer edges to the folding lines 10 and 11. Part of the material between slots 15 and 16, and part of that beyond 17, is preferably removed as shown. Corrugated pasteboard is good material from which to form the blank.

Assume the portion of the blank to the left of the cuts 12—17 to be folded over along the line of those cuts and upon the remainder of the blank. Also, assume the portion to the right of the cuts 14—15 to be similarly folded along the line of those cuts. The extreme ends of the blank will then be brought together at line 18 of Figure 2. The two ends are then secured together by a gummed piece of cloth 19.

Another piece of gummed cloth 20 is secured along the outer edge of that part D of the blank which is outside of the line 11 and cut 12. This piece 20 is at this stage secured only along its central portion, the ends being free. The free part is that shown extending to the right of the line 18, and to the left beyond the edge of the blank as shown in Figure 2.

Also, another piece of gummed cloth 21, of the same size and shape as 20, is secured to the corresponding part H of the blank which lies between cuts 13 and 14.

Eyelets 22 are secured in the outer corners of the parts T. Other eyelets 23 are secured in the shortened parts F and G. And still other eyelets 24 are secured in the part which forms the ends E of the completed box. In these eyelets at each end is threaded a cord or tape C. Secured in each end E is a button M.

Figure 2:
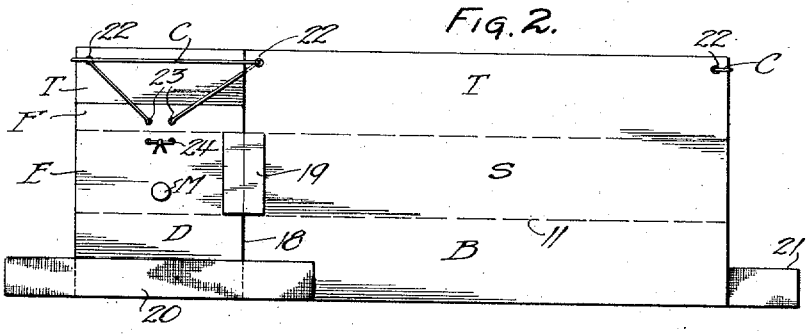
Figure 2 is the same blank on a larger scale, but partly folded, and with attachments secured thereto.
Figure 3:
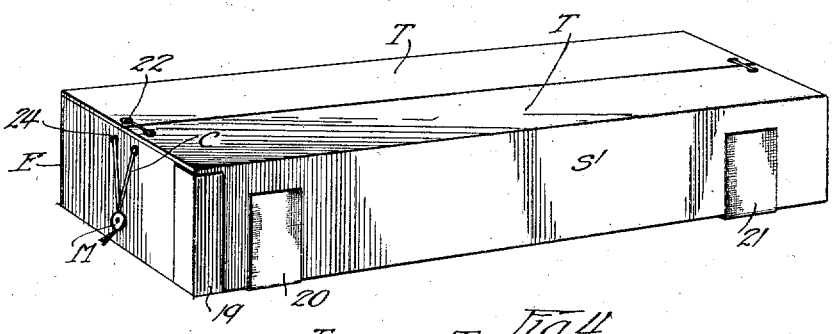
Figure 3 is the box in finished form.
Figure 4:
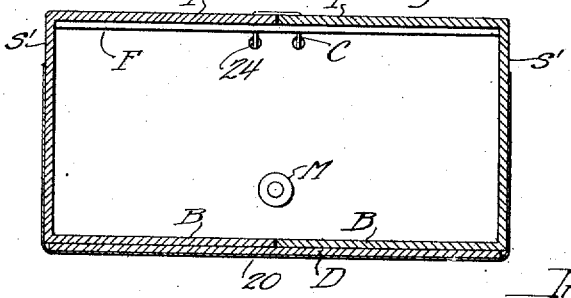
Figure 4 is an enlarged cross-section of the completed box near one end.
Figure 1:
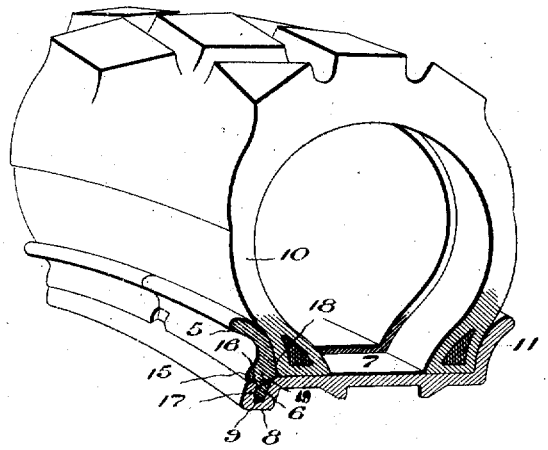
Figure 2:
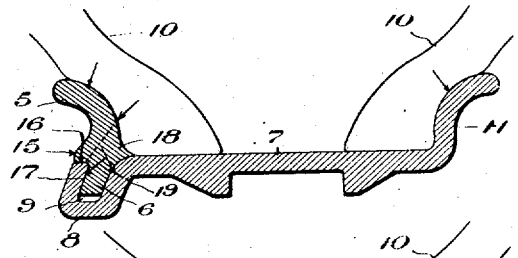
Figure 3:
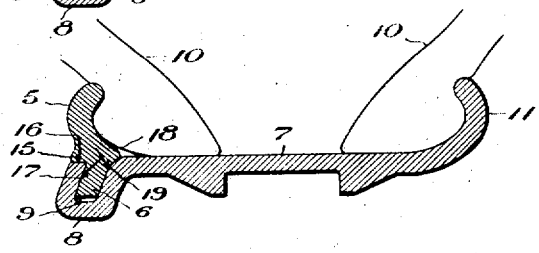

The box lying flat as shown in Figure 2 is in the condition in which it is shipped or delivered to the trade. Before leaving the factory, however, the board is broken, that is bent, along the lines 10 and 11, and also along the lines 12—17, 13—16 and 14—15. The box is finished at the place where it is to be used.

To finish or complete the box, the parts are shifted manually from flat to rectangular form. This is possible by reason of the patch or gummed piece 19 connecting the two ends of the blank to form one corner, the other corners being at the bends which are along the lines of the cuts before mentioned.

As soon as the rectangular shape is thus obtained, the bottom flaps B are folded inward to form a bottom to the box, and the end flaps D are folded toward each other Jan. 30, 1923.

Re. 15,533

J. B. ATKINS.
RIM STRUCTURE.
ORIGINAL FILED SEPT. 17, 1918.

2 SHEETS-SHEET 1

Inventor
James B. Atkins

By R. S. Trojner
Attorney